Sept. 14, 1965   D. W. CHAMBERLIN   3,205,993
APPARATUS FOR ORIENTING PEAR SHAPED ARTICLES
Filed April 8, 1963   5 Sheets-Sheet 1
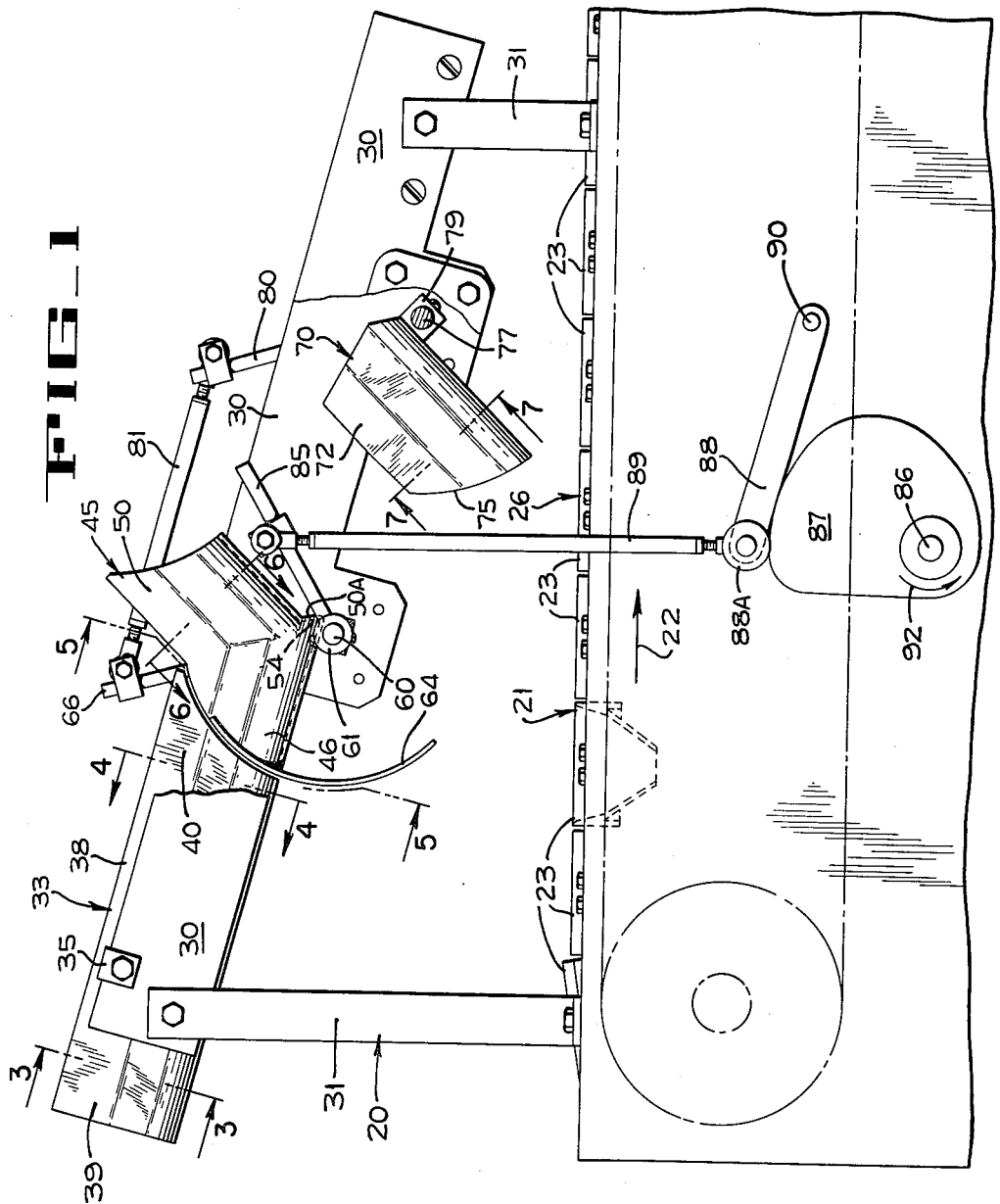
INVENTOR
DONALD W. CHAMBERLIN
BY
ATTORNEY Sept. 14, 1965   D. W. CHAMBERLIN   3,205,993
APPARATUS FOR ORIENTING PEAR SHAPED ARTICLES
Filed April 8, 1963   5 Sheets-Sheet 2
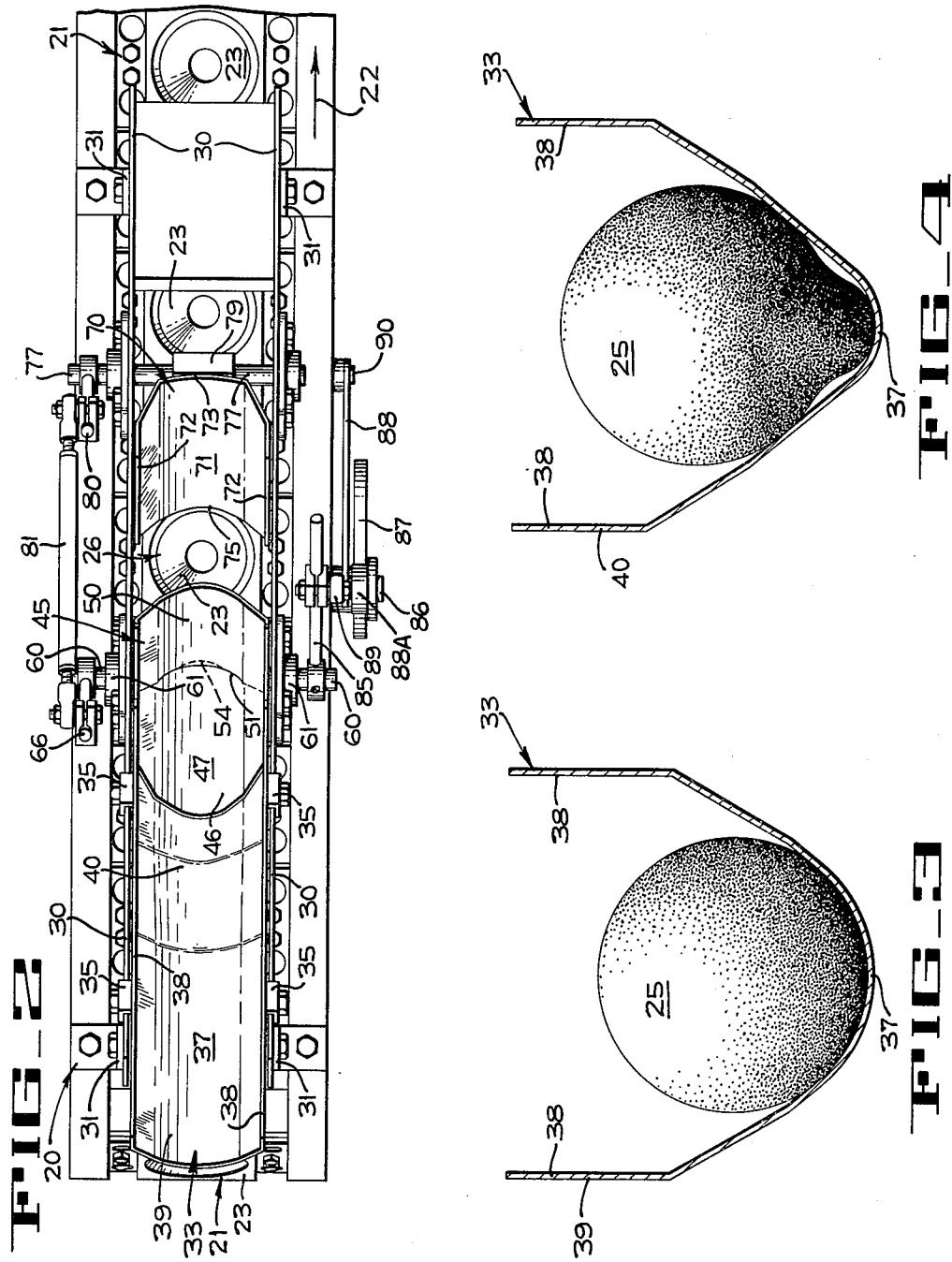
INVENTOR
DONALD W. CHAMBERLIN
BY
ATTORNEY

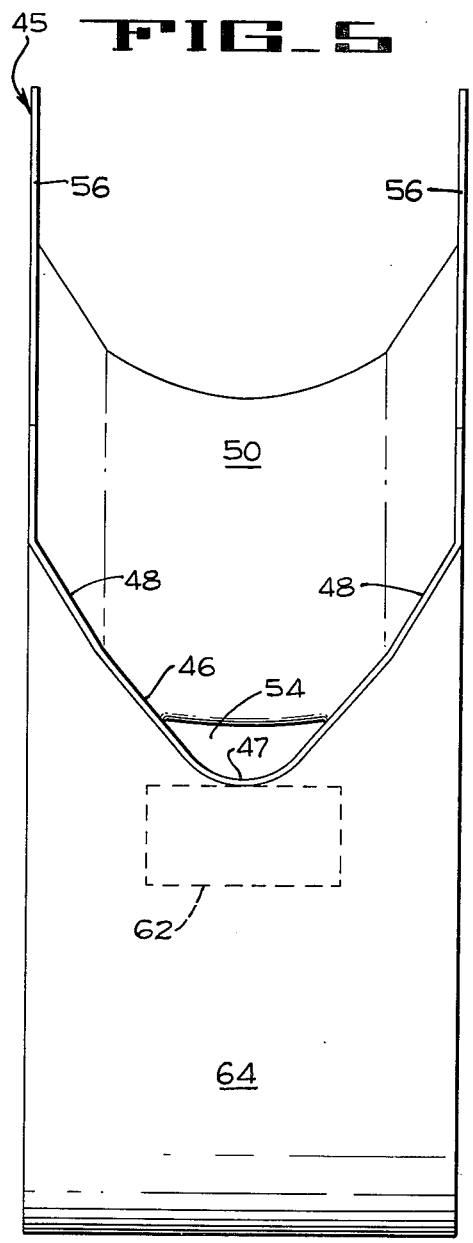
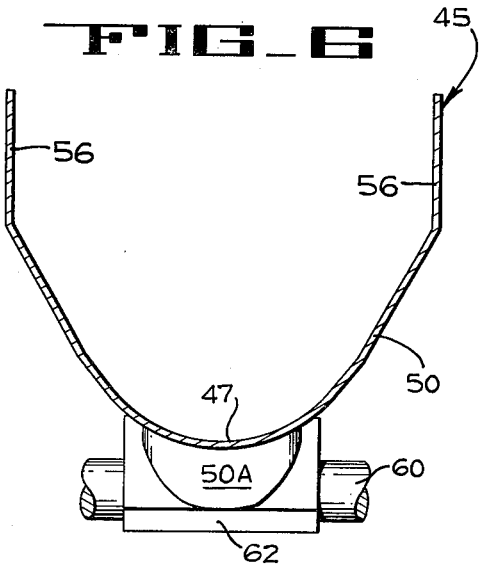
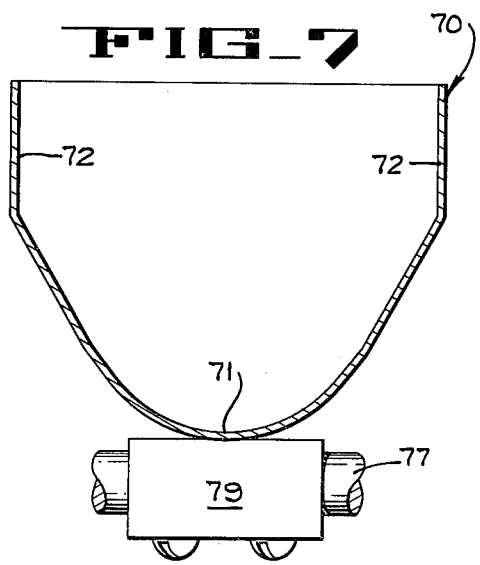

Sept. 14, 1965 D. W. CHAMBERLIN 3,205,993
APPARATUS FOR ORIENTING PEAR SHAPED ARTICLES
Filed April 8, 1963 5 Sheets-Sheet 4
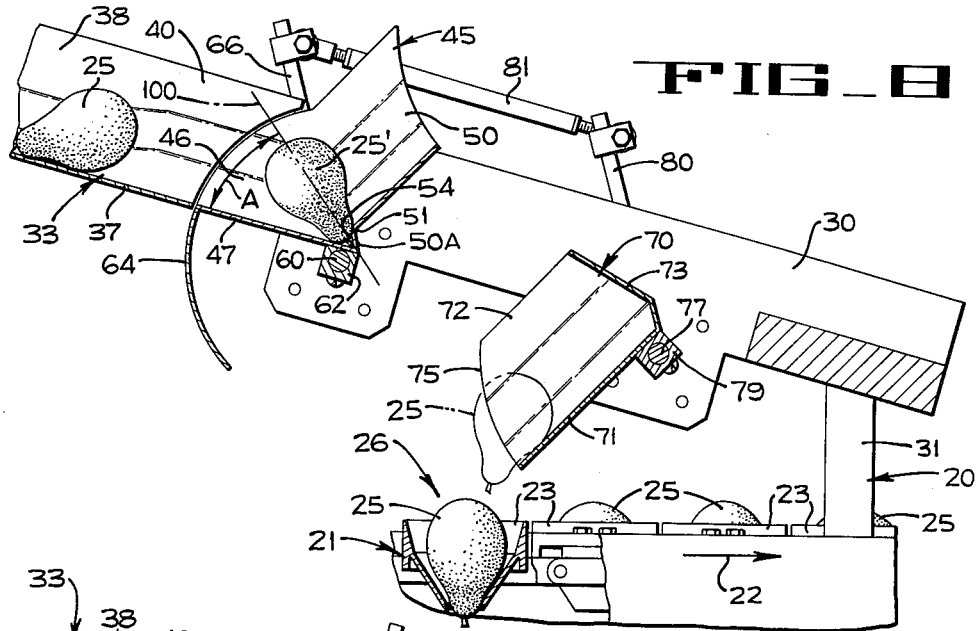
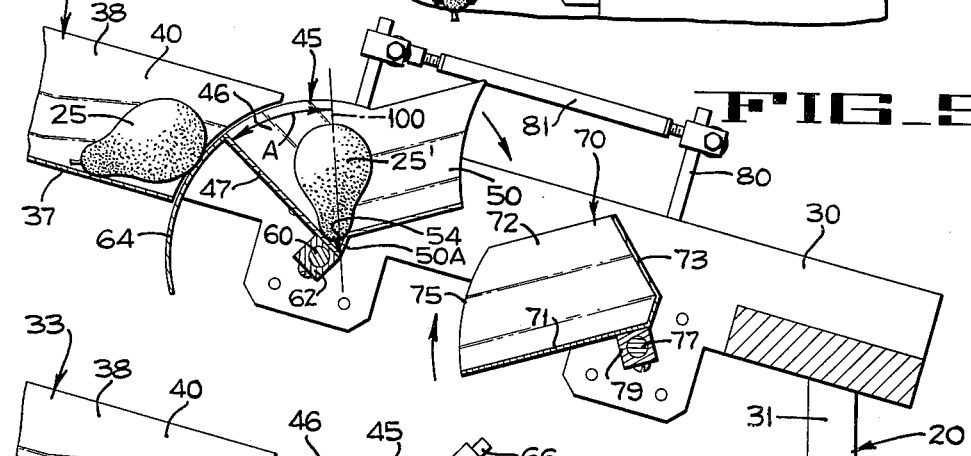
INVENTOR
DONALD W. CHAMBERLIN
BY *Hans G. Hoffmeister*
ATTORNEY

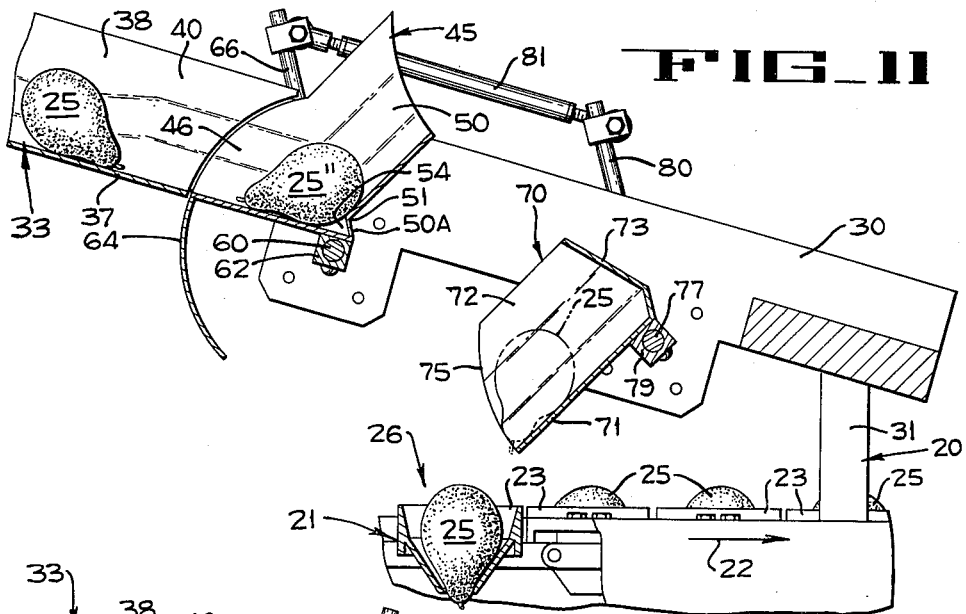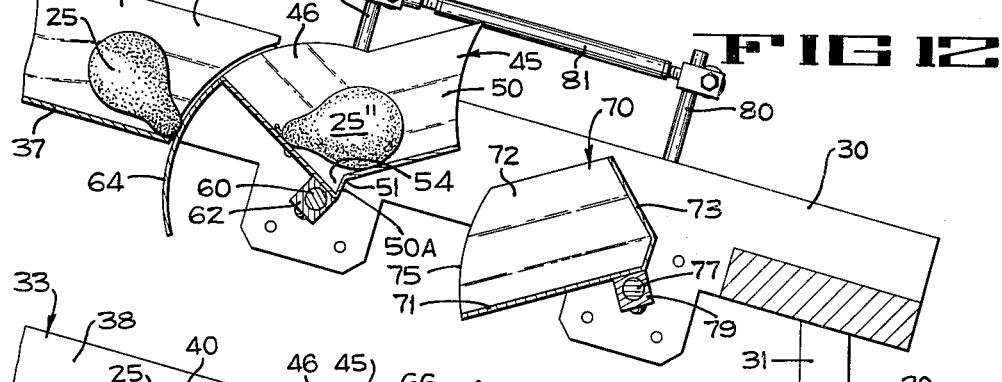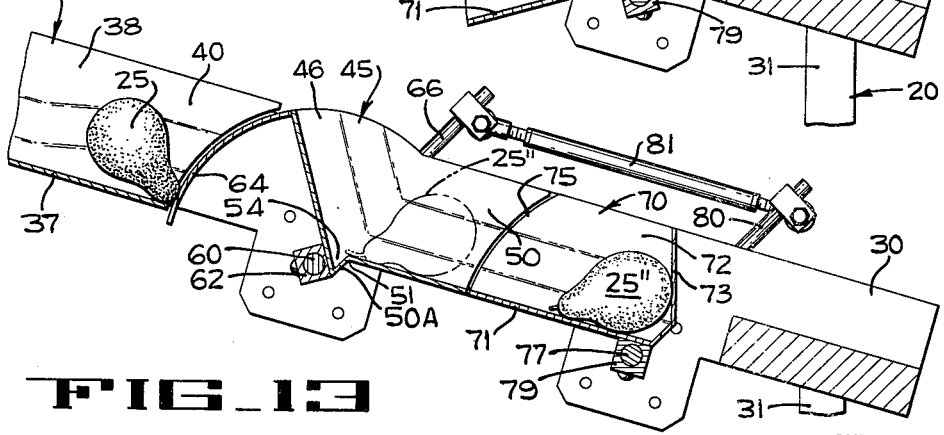

United States Patent Office 3,205,993
Patented Sept. 14, 1965

3,205,993
APPARATUS FOR ORIENTING PEAR SHAPED ARTICLES
Donald W. Chamberlin, Los Gatos, Calif., assignor to FMC Corporation, San Jose, Calif., a corporation of Delaware
Filed Apr. 8, 1963, Ser. No. 271,061
7 Claims. (Cl. 193—43)

The present invention pertains to an article orienting apparatus and more particularly to an apparatus for orienting elongated articles which have opposite large and small ends, such as pears, so that the small ends of all of the articles point in a common direction.

In the mechanical handling and processing of pears, it is usually necessary to orient the pears into common attitudes for performing certain processing operations. For example, if the pears are to be moved by a horizontal conveyor under stemming and coring stations, the pears are preferably positioned on the conveyor with their stem ends pointing down.

The apparatus of the subject invention is capable of performing such orienting tasks and, therefore, accepts randomly oriented pears, preliminarily orients the pears so that all of their stem-blossom axes are aligned with a predetermined path, then orients the pears so that all of their stem ends point in the same direction along said path, and finally discharges all of the pears with their stem ends down.

Although the present apparatus is especially suited for orienting pears, it is useful for orienting other articles having a pear-like shape.

Accordingly, it is an object of the present invention to provide an apparatus for orienting articles, such as pears or articles with a pear-like shape, so that their small ends point in a common direction along a predetermined path.

Another object is to provide an apparatus which receives randomly oriented articles, such as pears, and which discharges such articles with their small ends pointing downward.

Another object is to provide an apparatus which differentiates between the opposite large and small ends of articles advancing into said apparatus and which discharges all of the articles with their large ends foremost.

Another object is to provide an apparatus which orients articles having opposite large and small ends by inverting only articles which enter the apparatus with their small ends foremost whereby all of the articles emerge from said apparatus with their large ends foremost.

These, together with other objects, will beecome apparent upon reference to the following description and accompanying drawings, in which:

FIG. 1 is a side elevation of an article orienting apparatus embodying the present invention, with portions broken away, and being mounted above a conveyor, only a portion which is illustrated, which receives articles from the apparatus.

FIG. 2 is a plan of the orienting apparatus and the conveyor of FIG. 1.

FIG. 3 is an enlarged transverse section taken on line 3—3 in FIG. 1 and showing an outline of a pear in the apparatus.

FIG. 4 is an enlarged transverse section taken on line 4—4 in FIG. 1 and also showing an outline of a pear.

FIG. 5 is an enlarged end elevation, as seen from a position indicated by line 5—5 in FIG. 1, and illustrating an orienting unit employed in the subject apparatus.

FIG. 6 is an enlarged fragmentary transverse section taken on line 6—6 in FIG. 1.

FIG. 7 is an enlarged fragmentary transverse section taken on line 7—7 in FIG. 1.

FIGS. 8, 9 and 10 are diagrammatic views generally similar to FIG. 1 and showing successive stages of operation of the subject apparatus when a pear having its stem end foremost enters the orienting unit.

FIGS. 11, 12 and 13 are diagrammatic views similar to FIGS. 8, 9 and 10 and showing successive stages of operation of the apparatus when a pear having its butt end foremost enters the orienting unit.

Referring more particularly to the accompanying drawings, the article orienting apparatus of the present invention includes a support frame generally identified by numeral 20 (FIGS. 1 and 2). A conveyor 21 is mounted in the frame and includes a horizontal upper run movable in a predetermined forward direction, indicated by the arrow 22. The conveyor provides a plurality of cups 23 adapted to receive pears 25 (FIG. 8) therein. As the cups 23 (FIG. 1) move forwardly along the upper run of the conveyor, they pass a receiving station 26.

The frame 20 includes a pair of elongated, rectangular, transversely spaced panels 30 which are mounted in inclined positions above the conveyor 21 by forward and rearward pairs of legs 31 upstanding from opposite sides of the conveyor. The subject orienting apparatus includes an input channel 33 (FIGS. 1 and 2) supported in inclined position between the panels by hangers 35. The input channel has a bottom wall 37 and side walls 38 upstanding from the bottom wall. Furthermore, the input channel includes an upper rear section 39 having a generally U-shaped cross section, as best illustrated in FIG. 3. That is, in the rear section, the bottom wall has a large enough radius to allow the butt ends of the largest pears 25 to be processed to fit complementarily against the bottom wall, as illustrated in FIG. 3. Further, the side walls in the rear section diverge upward from the bottom wall and thence project upward in substantially parallel relation to each other.

The input channel 33 also has a lower forward section 40 (FIGS. 1 and 2) wherein the cross section is generally V-shaped, as best illustrated in FIG. 4. Here, the radius of the bottom wall 37 is less than the radius of the bottom wall in the rear section 39, and the side walls 38 diverge upward from the bottom wall in such a spaced relationship that the butt ends of the pears 25 being processed cannot fit complementarily against the bottom wall; instead, as illustrated in FIG. 4, opposite sides of the butt ends of the pears substantially tangentially engage the side walls of the input channel whereas the stem ends of the pears dip down toward and against the bottom wall. This attitude is also illustrated by the pears in the forward input section 40 in FIGS. 8 and 11.

The rear input section 39 is integrally connected to the forward section 40 so that there is a smooth transition from said U-shaped section to said V-shaped section. Further, the input channel 33 has an inclination sufficient to cause pears 25 placed therein to slide by gravity from the rear section to the forward section and eventually out of said channel as its lower forward end.

An important feature of the present invention is an orienting unit 45 (FIGS. 1 and 2) which receives pears 25 from the input channel 33 and discharges these pears so that all of their butt ends are foremost. The orienting unit includes a rear article receiving member 46 having a generally V-shaped cross section substantially identical to the cross section of the forward section 40 of the input channel. Thus, it is noted in FIG. 5 that the receiving member 46 includes a concave bottom wall 47 and upwardly diverging side walls 48. The orienting unit also has a forward article discharging member 50 providing a wall of generally U-shaped cross section (FIG. 6) similar to the cross section of the rear section 39 of the input channel. The bottom walls of the receiving and discharging members converge toward a juncture 51 (FIG.

2) where these walls are integrally interconnected. At this juncture the discharge member 50 has a generally triangular portion 50A which extends at an angle to the main part of the bottom wall of member 50 to provide an abutment wall and to coact with the bottom portion of the receiving member 46 to define a pocket 54. The pocket is large enough to receive the stem ends of some, mostly the smaller, pears 25 but not sufficiently large to receive the butt ends of any of the pears. The orienting unit also has a pair of substantially parallel side walls 56 projecting upward from the opposite side edges of the receiving and discharging members for confining pears within the unit.

The orienting unit 45 (FIGS. 1 and 2) is mounted in the frame 20 on a rear rock shaft 60. The rock shaft is supported by the panels 30 transversely of the input channel 33 and is rotatably received in bearings 61. A block 62 (FIGS. 5 and 6) is secured to the underside of bottom wall 47 under the pocket 54 and is connected to the rock shaft. By this connection the orienting unit is mounted for rocking movement between a pear-receiving or loading position (FIG. 8) with the receiving member in alignment with the forward section 40 of the input channel 33 and the discharging member extending forward and upward from the receiving member, and a discharging or unloading position (FIG. 10) with said discharging member projecting forward and downward from the rock shaft and the receiving member projecting rearward and upward from the rock shaft and out of alignment with the input channel. A gate 64 is secured to the receiving member 46 for movement into a blocking position across the forward end of the input channel when the orienting unit is in its discharging position. When the orienting unit is in its receiving position (FIG. 8), the gate is withdrawn from said blocking position and extends downward from the bottom wall 37 of the input channel. A rear lever 66 is secured to the rear rock shaft 60 for effecting said rocking movement of the orienting unit as will be subsequently apparent.

The present orienting apparatus also includes an output channel 70 for receiving pears from the orienting unit 45 and discharging these pears into the conveyor cups 23. The output channel has a generally U-shaped cross section (FIG. 7) identical to that of the discharging wall 50 and includes a bottom wall 71, side walls 72 diverging upward from the bottom wall, and a forward end wall 73 interconnecting the bottom and side walls. The output channel also has a rear open end 75 (FIG. 2) opposite to the forward end wall. The output channel is mounted for rocking movement about an axis parallel to the rear rock shaft 60. For this purpose, a forward rock shaft 77 is journalled in the frame 20 in forwardly spaced, parallel relation to the rear rock shaft. A block 79 is secured to the bottom wall of the output channel adjacent to the forward end wall and also to the forward rock shaft. Furthermore, a forward lever 80 is secured to the forward rock shaft 77 and projects upward therefrom.

The forward and rear levers 80 and 66 are interconnected by a longitudinally adjustable tie rod 81 (FIGS. 1 and 2) for unitary rocking movement of the orienting unit 45 and of the output channel 70. The output channel rocks between a receiving position (FIG. 10) and a discharging position (FIG. 8). In its receiving position, its bottom and side walls 71 and 72 are in alignment with the bottom and side portions of the discharging member 50, assuming the orienting unit to be in its described discharging position. In the discharging position of the output channel, the bottom wall 71 projects rearward and downward from the forward rock shaft, and the open end 75 is over the receiving station 26 of the conveyor 21.

In order to impart rocking movement to the orienting unit 45 and the output channel 70, a rocking arm 85 (FIG. 1) is secured to and radially projects from the rear rock shaft 60. A cam shaft 86 is journalled in the frame 20 below the conveyor 21, and a cam 87 is secured to the cam shaft. A cam follower 88 has an end roller 88A riding on the cam and an opposite end connected to the rocking arm by a longitudinally adjustable link 89. The cam follower has an end 90 pivoted to the frame so that as the cam shaft rotates, the rocking arm is moved upwardly and downwardly to rock the rear shaft 60 and, through the levers 66 and 80 and the tie rod 81, the forward shaft 77. This, of course, rocks the orienting unit and the output channel between their described positions. As the shape of the cam indicates, and assuming rotation in the direction of arrow 92, the orienting unit moves slowly from its receiving position to its discharging position and returns rapidly from its discharging position to its receiving position.

The operation of the article orienting apparatus of the present invention is briefly summarized at this point. With reference to FIGS. 1 and 2, pears 25 are supplied to the input channel 33 either automatically or by hand and without regard to their orientation. As the pears slide down the rear section 39 they roll against the side and bottom walls 38 and 37 until their stem blossom axes are aligned with the channel whereupon they simply slide toward the lower forward end of the input channel. When a pear having its stem end foremost enters the forward section 40 of the input channel, the sides of the butt end of the pear tangentially engage the side walls 38 and the stem end of this pear dips down against the bottom wall so that the stem blossom axis of the pear is forwardly declined, as illustrated by the pear in the input channel in FIG. 11.

FIGS. 8, 9 and 10 illustrate the movement of a pear 25' having its stem end foremost forwardly from the input channel 33 through the apparatus. Thus, in FIG. 8, the orienting unit 45 is in its pear receiving position whereas the output channel 70 is in its discharging position. Therefore, the pear slides from the input channel onto the receiving member 46 of the orienting unit with its stem blossom axis remaining in the same forwardly declined attitude because of the identity of cross sections of the forward section 40 and the receiving member 46. The V-shape of the receiving member thus distinguishes stem-end forward pears from butt-end forward pears by positioning the stem ends of stem-end forward pears forwardly and below their butt ends. It is significant that engagement of the butt end of each stem-end forward pear with the side walls 48 maintains the stem blossom axis of the pear at a higher angle A than would exist if the receiving member were U-shaped; as will subsequently be seen, this angular positioning facilitates turn-over of the stem-end forward pears. The stem end of the pear slides down toward the pocket 54 and, depending on the size of the pear, projects into or plugs the pocket whereupon forward movement of the pear stops. After the pear is in the receiving member and as a result of continued rotation of the cam shaft 86 (FIG. 1), the orienting unit 45 begins clockwise movement (FIG. 9) toward its discharging position while the output channel 70 also begins clockwise movement toward its receiving position. As the orienting unit moves out of its receiving position, the gate 64 blocks movement of pears in the input channel 33 out of the forward open end thereof. Since the stem end of the pear is positioned against the juncture 51 of the receiving and discharging members 46 and 50 and may even project into the pocket, rocking of the orienting unit tips the pear up on its stem end. It is to be observed that with the stem end directed toward the pocket 54, the stem-blossom axis of the pear is substantially coaxial with a line of symmetry, or centerline, 100 (FIG. 8) of the pocket. As the orienting unit rocks from its receiving position to its discharging position, this centerline, and thus the stem-blossom axis, moves from one side of a vertical to the opposite side. When the orienting unit is intermediate its receiving and discharging positions (FIG. 9), the orienting unit has moved the stem blossom axis of the pear past a vertical position whereupon the pear topples over onto the discharging member 50 with its butt end foremost. Since the side walls 48 hold the stem-blossom axis at a relatively large angle A, the pear topples over sooner than if the butt end were against the bottom wall 47 and the angle A were smaller. Of greatest significance, however, is the fact that the steeper angle A insures that the stem-end forward pears will in fact turn over and not simply slide stem-end forward into the discharging member. If the stem ends are small enough to project into the pocket 54, the pocket will prevent such sliding and will assist in turning over the fruit. The position of the turned-over pear is shown in phantom outline in FIG. 10. The U-shaped cross section of the discharging member aligns the stem-blossom axis of the pear with the output channel 70. The pear then slides down the discharging member and onto the bottom wall 71 of the output channel and stops when it abuts the forward end wall 73 (full lines in FIG. 10). After the pear is in the output channel, the orienting unit is quickly rocked back to its receiving position and the output channel is quickly rocked to its discharging position, as illustrated in FIG. 8, whereupon the pear in the output channel slides down the bottom wall through the open end 75 and into a cup 23 of the conveyor 21 which is then at the receiving station 26. As illustrated, the pear is deposited in the cup with its stem end down.

With reference to FIGS. 11, 12 and 13, those pears 25″ which descend the input channel 33 with their butt ends foremost, slide down onto the receiving member 46 of the orienting unit 45 when it is in its receiving position, as illustrated in FIG. 11. In this instance, however, the butt end slides onto the discharging member 50 so that the pear bridges or spans the pocket 54 and the juncture 51. As the orienting unit rotates clockwise (FIG. 12) toward its discharging position, the pear is gradually slid from the receiving member onto the discharging member. When the orienting unit is in its discharging position and the output channel 70 is in its receiving position (FIG. 13), the pear slides down the discharging member onto the bottom wall 71 of the output channel and, as previously described, the pear slides into abutment with the end wall 73. Thereafter, as illustrated in FIG. 11, the output channel discharges the pear into a cup 23 of the conveyor 21 at the receiving station 26 so that the stem end of the pear is pointing down.

From the foregoing, it will be understood that the article orienting apparatus of the present invention positions pears, and like articles, so that their small ends point in the same direction even though the articles are delivered to the apparatus in a randomly oriented manner. It is significant that the apparatus differentiates between the small and the large ends of the pears as they advance forwardly into the apparatus and discharges all of the pears with their large ends foremost. Still further, it is important to note that the apparatus deposits pears individually into cups with the stem ends of the pears pointing down.

Although a preferred embodiment of the present invention has been shown and described, it is to be understood that various changes and modifications may be made in the details thereof without departing from the spirit and the scope of the appended claims.

Having described my invention, what I claim is new and desire to protect by Letters Patent is:

1. In an apparatus for processing elongated articles having opposite large and small ends, a unit for receiving said articles some of which have their large ends foremost and others of which have their small ends foremost and for discharging all of said articles with their large ends foremost, said unit including elongated article receiving and discharging members having walls converging toward a juncture where said walls are interconnected, and an abutment wall at the juncture of said receiving and discharging walls and defining a pocket opening between said members, said pocket having a center line angularly spaced from both of said receiving and discharging members, said receiving member being adapted to guide articles received by said unit toward said pocket whereby forwardly directed small ends of the articles project into said pocket and forwardly directed large ends of articles bridge said pocket and rest on said discharging member; and means mounting said unit for movement between an article receiving position with said pocket directed upward and said center line of the pocket on one side of a vertical and an article discharging position with said center line on the opposite side of the vertical.

2. In an apparatus for processing elongated articles having opposite large and small ends, a unit for receiving said articles some of which have their large ends foremost and others of which have their small ends foremost and for discharging all of said articles with their large ends foremost, said unit including elongated article receiving and discharging walls converging toward a juncture where said walls are interconnected, said discharging wall having an opening at said juncture, and an abutment projecting outward from said receiving end of the discharging walls around said opening and defining a pocket, said pocket having a center line angularly spaced from both of said receiving and discharging walls, said receiving wall being substantially V-shaped in transverse cross section and including side portions converging toward a bottom portion that is aligned with said pocket, said receiving wall being adapted to guide article received by said unit toward said pocket whereby forwardly directed small ends of the articles project into said pocket and forwardly directed large ends of articles bridge said opening and rest on said discharging wall; and means mounting said unit for movement between an article receiving position with said pocket directed upward so that the center line of the pocket is on one side of a vertical and an article discharging position wherein the center line of the pocket is on the opposite side of the vertical.

3. The apparatus of claim 1 wherein said mounting means includes an axis member connected to said unit under said pocket and extending transversely of said walls, said unit being pivotable on said axis between said receiving and discharging positions.

4. An apparatus for orienting articles each having a large end tapering toward a small end, comprising an article orienting device having a rear article receiving portion, a forward article discharging portion, and a juncture between said portions, said portions having longitudinal dimensions converging toward said juncture; means mounting said orienting device for rocking movement about a substantially horizontal axis disposed transversely of said receiving and discharging portions, between an article receiving position with said receiving portion declined to enable articles placed on said receiving portion to slide toward said juncture, and an article discharging position with said discharge portion declined to enable articles to slide off from said device; means for delivering articles onto said receiving portion so that certain articles have their large ends directed towards said juncture and so that other articles have their small ends directed toward said juncture, said receiving portion being so shaped as to be engageable with the large ends of articles thereon for maintaining forwardly directed small ends of articles below the large ends of such articles, for guiding said smaller ends toward and into abutment with said juncture, and for guiding forwardly directed large ends of articles across said juncture and onto said discharging portion; and means for rocking said orienting device from said receiving position to said discharging position, and return, whereby articles whose small ends abut said juncture are turned over and laid on said discharging portion with their large ends directed forward and whereby articles on said receiving portion whose large ends are already directed forwardly slide forwardly onto said discharging portion with said large ends remaining forwardly directed.

5. In an apparatus for orienting pears and the like so that their stem ends point in a common direction with respect to a predetermined path, a frame; a pear input channel having a bottom wall and opposite side walls and an open discharge end at which said side and bottom walls are generally in the form of a V; means mounting said input channel in said frame in alignment with said path and so that it slopes down toward its discharge end; a pear output channel having opposite closed and open ends; means pivotally mounting said output channel for movement between a pear receiving position substantially aligned with said input channel and with said open end directed toward and spaced from said input channel, and a pear discharging position with said open end below said closed end; an orienting unit having a generally V-shaped receiving wall corresponding to the V-shaped discharge end of said input channel, a concave discharging wall angularly related to said receiving wall, and a stem end receiving pocket between said walls, said walls converging toward said pocket; and means pivotally mounting said orienting unit on said frame for movement about an axis transversely of said path and adjacent to said pocket between a loading position with said receiving wall adjacent to and in alignment with the bottom wall of said input channel at the discharge end thereof to allow pears to slide from said input channel into said orienting unit whereby forwardly directed stem ends fit into said pocket whereas forwardly directed butt ends bridge said pocket and rest on said discharging wall, and an unloading position with said discharging wall aligned with said output channel when the latter is in its receiving position whereby pears on said discharging wall slide into said output channel, movement of said unit from loading to unloading position causing the butt ends of pears which have their stem ends in said pocket to drop onto said discharging wall in advance of their stem ends so that all of the pears sliding into said output channel have their butt ends directed toward said closed end.

6. In an apparatus for orienting pears and the like so that their stem ends point in a common direction with respect to a predetermined path, a frame; a pear input channel having a bottom wall, opposite side walls and an open discharge end at which said side and bottom walls are generally in the form of a V; means mounting said input channel in said frame in alignment with said path and so that it slopes down toward its discharge end; a pear output channel having opposite closed and open ends; means pivotally mounting said output channel for movement between a pear receiving position substantially aligned with said input channel and with said open end directed toward and spaced from said input channel, and a pear discharging position with said open end below said closed end; an orienting unit having a generally V-shaped receiving wall corresponding to the V-shaped discharge end of said input channel, a concave discharging wall angularly related to said receiving wall, and a stem end receiving pocket between said walls, said walls converging toward said pocket; means pivotally mounting said orienting unit on said frame for movement about an axis transversely of said path and adjacent to said pocket between a loading position with said receiving wall adjacent to and in alignment with the bottom wall of said input channel at the discharge end thereof to allow pears to slide from said input channel into said orienting device whereby forwardly directed stem ends fit into said pocket whereas forwardly directed butt ends bridge said pocket and rest on said discharging wall, and an unloading position with said discharging wall aligned with said output channel when the latter is in its receiving position whereby pears on said discharging wall slide into said output channel, movement of said unit from loading to unloading position causing the butt ends of pears which have their stem ends in said pocket to drop onto said discharging wall in advance of said their stem ends so that all of the pears sliding into said output channel have their butt ends directed towards said closed end; and movement synchronizing means interconnecting said output channel and said orienting unit so that when said output channel is in its discharging position, said orienting unit is in its loading position, and vice versa.

7. In an apparatus for handling pear-shaped articles having relatively larger rounded butt-ends and relatively smaller stem-ends, an orienting unit including a forward channel-shaped discharging portion having a bottom wall, and a rear receiving portion connected to said discharging portion and having a bottom wall angularly related to and meeting the bottom wall of the discharging portion in a juncture, said receiving portion having side walls diverging upward from said bottom wall and slidably engageable with the butt-end of articles in said receiving portion to maintain the axis of said articles in acute angular relation to the bottom wall of said receiving portion with the stem-end of said articles, having their stems forward, below and forward of said butt-end; and means mounting said unit for rocking movement about a substantially horizontal axis disposed transversely of said receiving and discharging portions between a first position with said bottom wall of the receiving portion at a predetermined angle to the horizontal and a second position with said bottom wall of the receiving portion at an angle to the horizontal that is greater than said predetermined angle whereby an article with its stem end forward of and below its butt end and with said stem against said juncture topples over onto said bottom wall of the discharging member with said butt end forward of said stem end when said orienting unit is rocked from said first position to said second position.

References Cited by the Examiner

UNITED STATES PATENTS

| | | | |
|---|---|---|---|
| 1,435,263 | 11/22 | Soubier. | |
| 2,419,242 | 4/47 | Woodberry et al. | |
| 2,603,331 | 7/52 | Coons | 193—43 |
| 2,627,345 | 2/53 | Yates. | |
| 2,630,221 | 3/53 | Stewart | 198—33.4 |
| 3,095,957 | 7/63 | Roberts et al. | |

References Cited by the Applicant

UNITED STATES PATENTS

| | | |
|---|---|---|
| 2,534,362 | 12/50 | Magnuson. |
| 2,752,028 | 6/56 | Moskowitz. |
| 2,846,830 | 8/58 | Bossi. |

SAMUEL F. COLEMAN, *Primary Examiner.*

ANDRES H. NIELSEN, ERNEST A. FALLER,
*Examiners.*